(12) United States Patent
Son et al.

(10) Patent No.: US 9,291,477 B2
(45) Date of Patent: Mar. 22, 2016

(54) SAMPLING ENERGY METER READING SYSTEM USING DEMAND RESPONSE OF ENERGY PRICES FOR A POWER SAVING MODE

(75) Inventors: Dong Min Son, Suwon (KR); Jung Hwan Oh, Seoul (KR); Jae Seong Park, Daejeon (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 605 days.

(21) Appl. No.: 13/218,344

(22) Filed: Aug. 25, 2011

(65) Prior Publication Data

US 2012/0059610 A1    Mar. 8, 2012

(30) Foreign Application Priority Data

Sep. 3, 2010   (KR) .......................... 10-2010-0086730

(51) Int. Cl.
*G01R 21/00* (2006.01)
*G01D 4/00* (2006.01)

(52) U.S. Cl.
CPC ............... *G01D 4/002* (2013.01); *Y02B 90/241* (2013.01); *Y02B 90/246* (2013.01); *Y04S 20/32* (2013.01); *Y04S 20/42* (2013.01)

(58) Field of Classification Search
CPC .............................. G06Q 30/04; G06Q 50/06
USPC ........ 340/870.02, 870.28, 531; 370/346, 352, 370/531, 336; 702/62
See application file for complete search history.

(56) References Cited

U.S. PATENT DOCUMENTS 5,963,650 A * 10/1999 Simionescu et al. ............. 705/63
7,385,524 B1 * 6/2008 Orlosky .................... 340/870.28
(Continued)

FOREIGN PATENT DOCUMENTS

| JP | 3022948 | 4/1996 |
| JP | 2002369385 | 12/2002 |

(Continued)

OTHER PUBLICATIONS

Minosi, A.; Martinola, A.; Mankan, S.; Balzarini, F.; Kostadinov, A.N.; Prevostini, A., "Intelligent, low-power and low-cost measurement system for energy consumption," Virtual Environments, Human-Computer Interfaces and Measurement Systems, 2003. VECIMS '03. 2003 IEEE International Symposium on, vol., No., pp. 125,130, Jul. 27-29, 2003.*

(Continued)

*Primary Examiner* — Sujoy Kundu
*Assistant Examiner* — Ricky Ngon
(74) *Attorney, Agent, or Firm* — Lee, Hong, Degerman, Kang & Waimey (57) ABSTRACT

Disclosed is an energy metering system, apparatus and method that enables an energy meter to reduce power consumed in communication when remotely inspecting the energy meter under an energy pricing system changed depending on time. To this end, the energy meter transmits information on energy consumption at only a changed time of energy price, and operates in a power saving mode except the changed time. If the information on the energy consumption is transmitted at the changed time, the information on the energy consumption in each period having the same energy price is secured, and therefore, a central server has no difficulty in calculating an energy consumption rate. Thus, it is possible to minimize power consumed in communication while transmitting all the information on the energy consumption, required in the central server. Particularly, a battery is used longer in an environment using the battery, thereby reducing maintenance/repair cost.

5 Claims, 5 Drawing Sheets

(56) References Cited

U.S. PATENT DOCUMENTS

| | | | |
|---|---|---|---|
| 7,535,378 B2* | 5/2009 | Cornwall | 340/870.02 |
| 7,541,941 B2* | 6/2009 | Bogolea et al. | 340/870.02 |
| 2002/0046299 A1* | 4/2002 | Lefeber et al. | 709/318 |
| 2008/0224892 A1 | 9/2008 | Bogolea et al. | |
| 2009/0322556 A1* | 12/2009 | Cook et al. | 340/870.02 |

FOREIGN PATENT DOCUMENTS

| | | |
|---|---|---|
| JP | 2004-020228 | 1/2004 |
| JP | 2005-174107 | 6/2005 |
| JP | 2005174107 | 6/2005 |
| JP | 2010062609 | 3/2010 |
| KR | 1020050012572 | 2/2005 |

OTHER PUBLICATIONS

Korean Intellectual Property Office Application Serial No. 10-2010-0086730, Office Action dated Oct. 24, 2011, 3 pages.

Japanese Patent Office Application Serial No. 2011191373, Office Action dated Nov. 20, 2012, 2 pages.

The State Intellectual Property Office of the People's Republic of China Application Serial No. 201110264157.1, Office Action dated Oct. 29, 2013, 8 pages.

* cited by examiner

SAMPLING ENERGY METER READING SYSTEM USING DEMAND RESPONSE OF ENERGY PRICES FOR A POWER SAVING MODE

CROSS-REFERENCE TO RELATED APPLICATION

Pursuant to 35 U.S.C. 119(a), this application claims the benefit of earlier filing date and right of priority to Korean Patent Application No. 10-2010-0086730, filed Sep. 3, 2010, the contents of which are hereby incorporated by reference herein in its entirety.

BACKGROUND OF THE INVENTION

1. Field of the Invention

An aspect of the present invention relates to an energy metering system, apparatus and method for reducing power used for communication of an energy meter. More particularly, an aspect of the present invention relates to an energy metering system, apparatus and method capable of transmitting energy consumption information necessary for a central server and minimizing power used for communication by properly controlling the operation of a communication device according to an energy pricing system changed depending on time.

2. Description of the Related Art

If an energy meter is remotely inspected through a communication network in relation to energy consumption of electricity, gas, water or the like, a meterman may not directly visit each energy consuming household to reduce time and cost necessary for inspection.

However, power is necessarily consumed for the purpose of communication, and therefore, it is necessary to consider such a situation.

For example, an energy meter is occasionally installed in an environment in which it is difficult to supply power through a power line. In this environment, the energy meter is necessarily operated using power supplied by a battery.

In this instance, battery power is consumed in communication of the energy meter. If the battery power is rapidly consumed, the battery must be replaced with a new one, and hence much time and cost is spent in maintenance/repair of the energy meter. Such a problem is more serious in an area where many energy meters are installed.

A method for increasing battery capacity may be considered as one method for reducing the maintenance/repair cost of an energy meter. However, the method for increasing the battery capacity is directly related to increased cost.

SUMMARY OF THE INVENTION

Embodiments of the present invention provide an energy metering system, apparatus and method capable of transmitting energy consumption information necessary for a central server and minimizing power used for communication by properly controlling the communication operation of an energy meter according to an energy pricing system changed depending on time.

According to an aspect of the present invention, there is provided an energy metering system, including: a metering component configured to meter energy consumption; a bidirectional communication component configured to transmit information on the energy consumption to a metering data collector in connection with the metering component and receive a control signal from the metering data collector; the metering data collector configured to receive and collect the information on the energy consumption, transmitted by the bidirectional communication component, and then transmit the collected information to a central server, and transmit the control signal to the bidirectional communication component based on information on an energy pricing system, received from the central server; and the central server configured to transmit the information on the energy pricing system, changed depending on production and consumption situations of energy, to the metering data collector, and receive the information on the energy consumption, collected from the metering data collector, wherein, the bidirectional communication component determines a time at which the information on the energy consumption is to be transmitted, based on the control signal.

The control signal may include information that enables a time at which energy price is change to be determined as the time at which the information on the energy consumption is to be transmitted.

The energy may be any one of electricity, gas and water.

The bidirectional communication component may operate by receiving power supplied from a battery.

When the voltage of the battery decreases to a certain value or less, the bidirectional communication component may perform at least one of an operation of transmitting the information on the energy consumption to the metering data collector and an operation of transmitting an alarm message to the metering data collector.

The bidirectional communication component may operate in a saving mode at a time at which the information on the energy consumption is not transmitted.

According to an aspect of the present invention, there is provided an energy metering method for measuring energy consumption of a load connected to an energy meter and transmitting information on the metered energy consumption, the energy metering method including: receiving a control signal related to a time at which the information on the energy consumption is to be transmitted; metering energy consumption of the load connected to the energy meter; storing the information on the measured energy consumption; and transmitting the information on the energy consumption at a time predetermined by the control signal.

The time predetermined by the control signal may be a time at which energy price is changed.

The energy meter may operate in a power saving mode at a time at which the predetermined time is not reached.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE INVENTION

The present invention is described more fully hereinafter with reference to the accompanying drawings, in which embodiments of the present invention are shown. This present invention may, however, be embodied in many different forms and should not be construed as limited to the embodiments set forth herein. Rather, these embodiments are provided so that this disclosure is thorough, and will fully convey the scope of the present invention to those skilled in the art.

Figure 1:
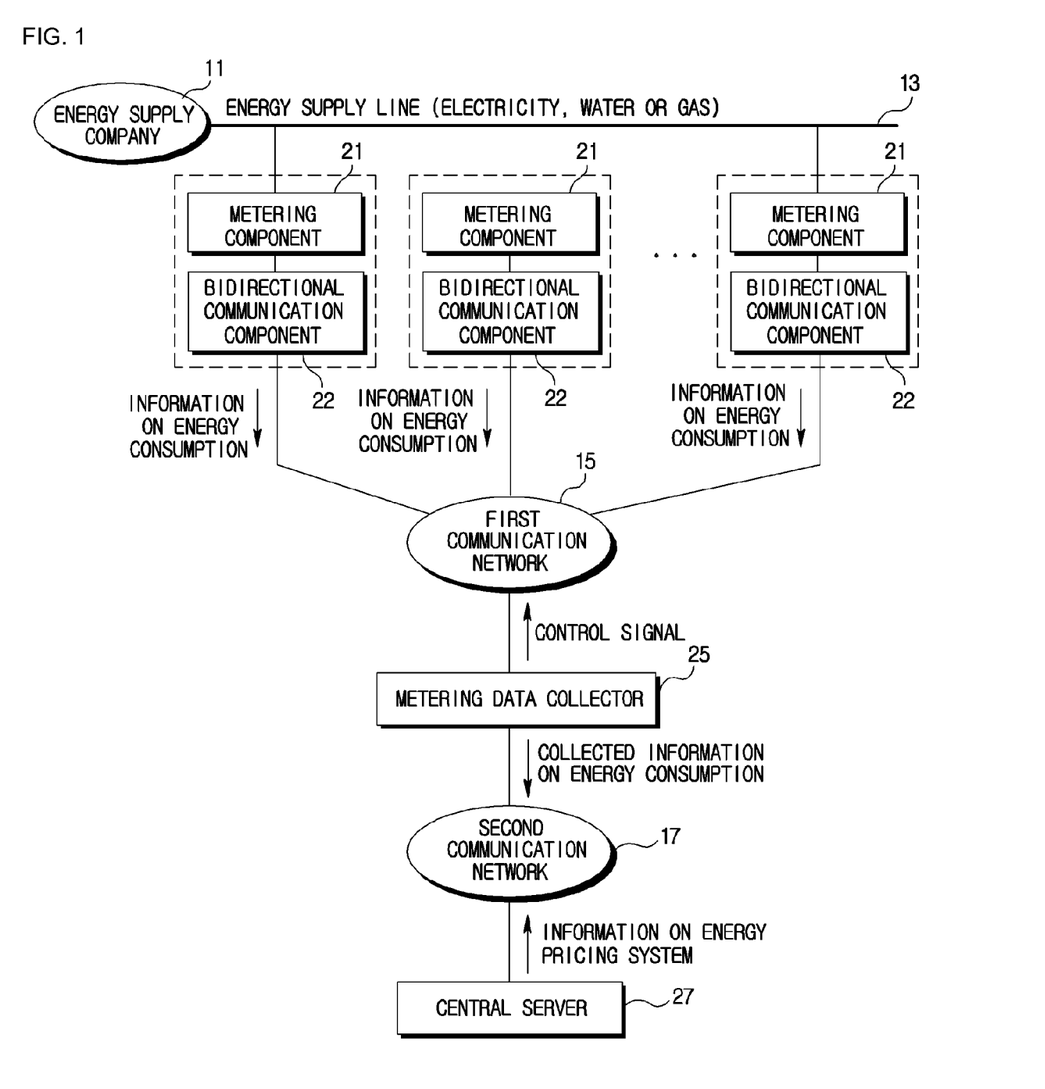
FIG. 1 illustrates an embodiment of an energy metering system according to the present invention.

Referring to FIG. 1, energy supplied from an energy supply company 11 is supplied to each energy consuming household through an energy supply line 13. Each of the energy consuming households uses the energy supplied through the energy supply line 13.

In the present invention, the energy refers to any one of electricity, gas and water.

An energy metering system according to an embodiment of the present invention includes a plurality of metering components 21, a bidirectional communication component 22 provided corresponding to each of the metering components 21, and a metering data collector 25 that relays energy related information transmitted and received between a central server 27 and each of the bidirectional communication components 22, and the central server 27.

The metering component 21 meters energy consumption at each place such as an energy consuming household, which becomes a charge unit of energy consumption rate. As a specific example, the metering component 21 may meter a consumption amount of accumulated energy.

The function of the metering component 21 may be performed by a watt-hour meter, gas meter, water meter or the like, which is installed in each of the energy consuming households so as to meter an energy consumption amount. The metering component 21 may be variously configured according to the kind of energy and required functions.

The bidirectional communication component 22 is connected to the metering component 21. The bidirectional communication component 22 functions to transmit information on the energy consumption metered by the metering component 21 to the metering data collector 25 through a first communication network 15.

An external modem may be used as an example of the bidirectional communication component 22.

Particularly, when the bidirectional communication component 22 is will transmit the information on the energy consumption is determined by a control signal transmitted from the metering data collector 25. The bidirectional communication component 22 transmits the information on the energy consumption only at a corresponding time.

Hereinafter, for convenience of illustration, the time at which the bidirectional communication component 22 transmits the information on the energy consumption to the metering data collector 25 is referred to as a 'transmission time'.

Figure 2:
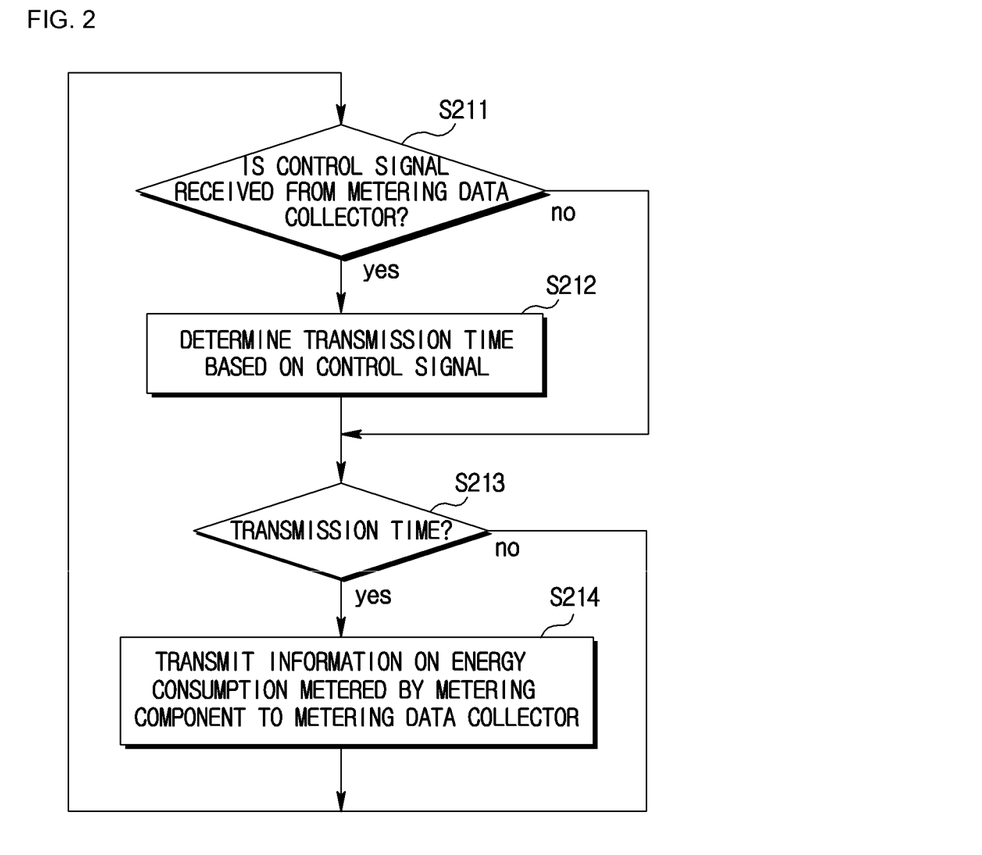
FIG. 2 illustrates an example related to the operating process of a bidirectional communication component.

An operating process of the bidirectional communication component 22 will be described with reference to FIG. 2.

If the bidirectional communication component 22 receives a control signal transmitted from the metering data collector 25 (S211), the bidirectional communication component 22 determines a transmission time based on the control signal (S212).

If the current time is the transmission time determined at the step S212 (S213), the bidirectional communication component 22 receives information on energy consumption from the metering component 21 and transmits the received information to the metering data collector 25 (S214).

In a case where the bidirectional communication component 22 is located at a position difficult to receive power supplied through a power line, the bidirectional communication component 22 may operate using a battery.

In this instance, the bidirectional communication component 22 may be configured to perform various emergency operations for coping with emergency situations related to the remaining capacity of the battery.

For example, in a case where the voltage of the battery is decreased to a certain value or less, the bidirectional communication component 22 may transmit information on current energy consumption or alarm message to the metering data collector 25 regardless of the transmission time.

The bidirectional communication component 22 may be configured to operate in a power saving mode, except the transmission time, so as to minimize power consumption.

The degree of operation in the power saving mode may be variously configured as occasion demands. The entire power is preferably interrupted except power required in performing the operation of transmitting the information on the energy consumption at the transmission time for examining a battery remaining capacity, current time, or the like.

The first communication network 15 through which the bidirectional communication component 22 and the metering data collector 25 communicate with each other may be variously configured. For example, the first communication network 15 may be configured as a network using a communication scheme such as wireless local area network (WLAN), Bluetooth or Zigbee.

The metering data collector 25 receives and collects information on the energy consumption, transmitted from the respective bidirectional communication components 22 and transmits the collected information to the central server 27 through a second communication network 17. The metering data collector 25 transmits a control signal to the bidirectional communication component 22 based on information on an energy pricing system, received from the central server 27.

The control signal refers to a signal that enables the bidirectional communication component 22 to determine a transmission time.

The metering data collector 25 may directly specify a transmission time and transmit the specified transmission time as a control signal. Alternatively, the metering data collector 25 may transmit, as a control signal, data information that enables the bidirectional communication component 22 to determine a transmission time by itself.

The central server 27 transmits the information on the energy pricing system, changed depending on the production and consumption situation of energy, to the metering data collector 25, and receives and processes the information on the energy consumption, collected and transmitted by the metering data collector 25.

The central server 27 is a server operated by the energy supply company 11. The central server 27 performs a variety of functions related to energy supply services including a service for analyzing and managing the energy consumption rate of each user, and the like.

The second communication network 17 through which the metering data collector 25 and the central server 27 communicate with each other may be variously configured. For example, the second communication network 17 may be an Internet network or a code division multiple access (CDMA) network.

A method of determining a transmission time will now be described in detail.

When the transmission time is determined in relation to the reduction of power consumption of the bidirectional communication component 22, they are necessarily satisfied together that the number of times at which the bidirectional communication component 22 communicates with the metering data collector 25 is reduced and that the central server 27 transmits all the information on the energy consumption, necessary for calculating the energy consumption rate.

To this end, a method of determining a time at which energy price is changed as the transmission time is used as a specific method.

The energy price is changed depending on time under a changed pricing system of the energy price.

Figure 3:
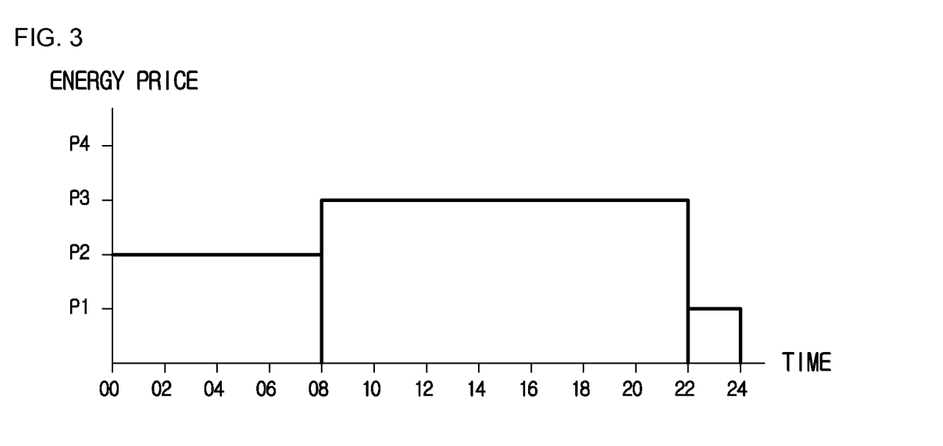
FIG. 3 illustrates an example of an energy pricing system in which energy price is changed depending on time.

FIG. 3 illustrates an example in which the unit energy price is P2 from 0 to 8 o'clock, P3 from 8 to 22 o'clock, and P1 from 22 to 24 o'clock.

In this instance, the minimum information necessary for calculating the energy consumption rate is information on energy consumption (information on energy consumption amount) in each period with the same energy price. Thus, if the bidirectional communication component 22 the information on the energy consumption, metered by the metering component 21 at a changed time of energy price (0, 8 or 22 o'clock), the central server 27 can calculate an energy consumption rate by receiving the information from the metering data collector 25.

In this example, the metering data collector 25 may transmit the changed time of the energy price (0, 8 or 22 o'clock) as a control signal, or may transmit the information on the energy pricing system as described in FIG. 3.

In the latter case, the bidirectional communication component 22 determines the transmission time by detecting the changed time of the energy price based on the information on the energy pricing system.

Figure 4:
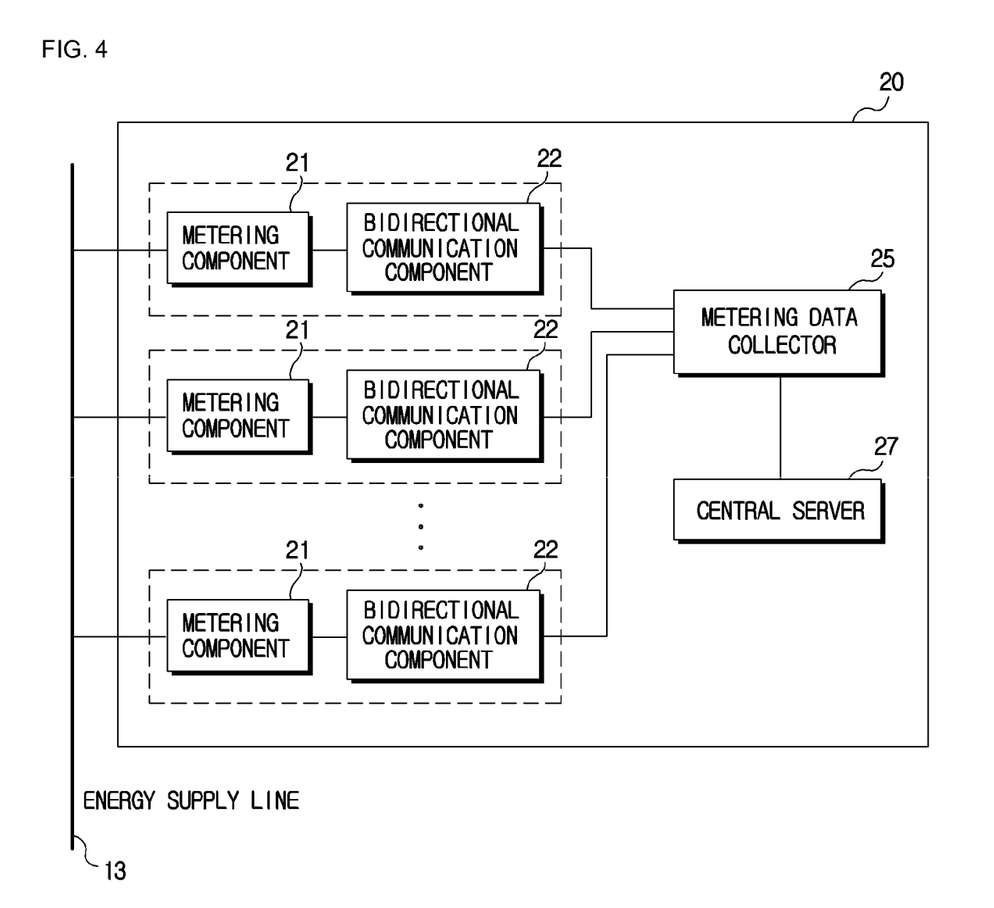
FIG. 4 illustrates an embodiment of an energy metering apparatus according to the present invention.

FIG. 4 illustrates an embodiment of an energy metering apparatus 20 according to the present invention. The energy metering apparatus 20 includes a plurality of metering components 21, a bidirectional communication component 22 provided corresponding to each of the metering components 21, and a metering data collector 25 that relays energy related information transmitted and received between a central server 27 and each of the bidirectional communication components 22, and the central server 27.

The functions of the metering component 21, the bidirectional communication component 22, the metering data collector 25 and the central server 27 are identical to those of the components in the energy metering system described above. Therefore, these components will be briefly described.

The metering component 21 meters energy consumption at each place such as an energy consuming household, which becomes a charge unit of energy consumption rate.

The bidirectional communication component 22 is connected to the metering component 21. If a transmission time is reached, the bidirectional communication component 22 transmits the information on the energy consumption metered by the metering component 21 to the metering data collector 25.

The transmission time is determined based on a control signal received from the metering data collector 25, and a changed time of energy price may be determined as the transmission time.

The bidirectional communication component 22 may operate in a power saving mode, except the transmission time.

In a case where the bidirectional communication component 22 is located at a position difficult to receive power supplied through a power line, the bidirectional communication component 22 may operate using a battery.

In this instance, the bidirectional communication component 22 may be configured to perform various emergency operations for coping with emergency situations related to the remaining capacity of the battery. For example, in a case where the voltage of the battery is decreased to a certain value or less, the bidirectional communication component 22 may transmit information on current energy consumption or alarm message to the metering data collector 25 regardless of the transmission time.

The metering data collector 25 receives and collects information on the energy consumption, transmitted from the respective bidirectional communication components 22 and transmits the collected information to the central server 27. The metering data collector 25 transmits, to the bidirectional communication component 22, a control signal that enables the bidirectional communication component 22 to determine the transmission time based on information on an energy pricing system, received from the central server 27.

The central server 27 performs a variety of functions related to energy supply services including a function of transmitting the information on the energy pricing system, changed depending on the production and consumption situation of energy, to the metering data collector 25, a function of calculating the energy consumption rate of each user by receiving the information on the energy consumption, collected and transmitted by the metering data collector 25, and the like.

Hereinafter, an embodiment of an energy metering method according to the present invention will be described with reference to FIGS. 5 and 6.

Figure 5:
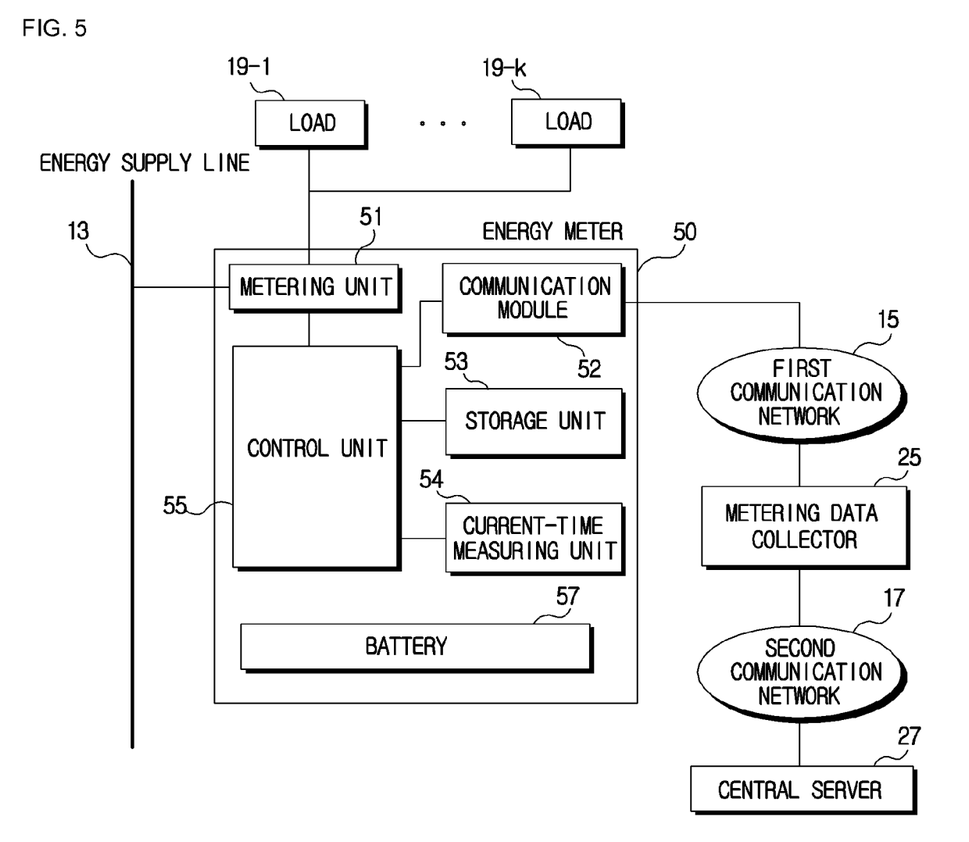
FIG. 5 illustrates an embodiment of an energy meter.
Figure 6:
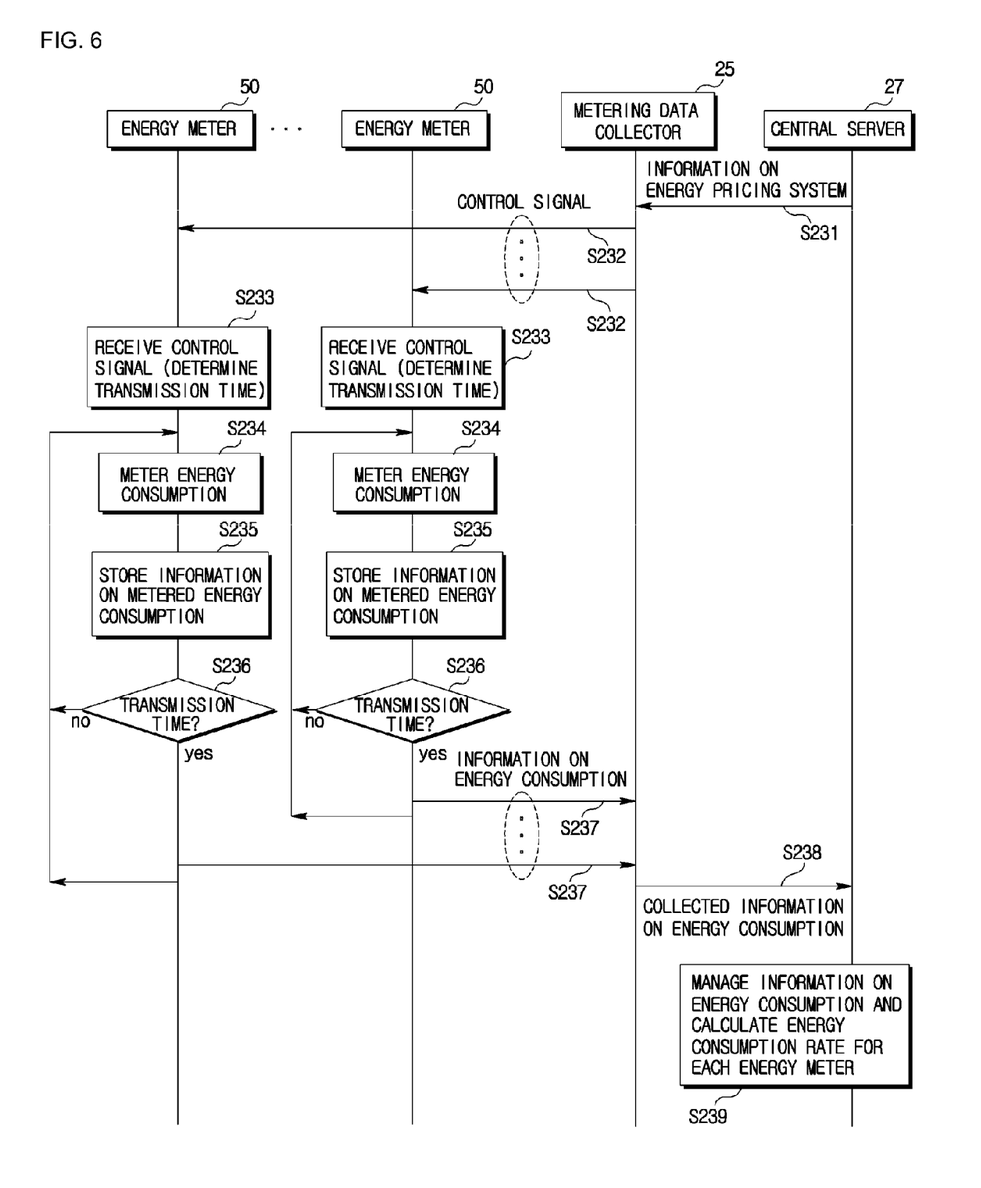
FIG. 6 illustrates an embodiment of an energy metering method according to the present invention.

FIG. 5 illustrates a specific example of the energy meter 50 that performs the functions of the metering component 21 and the bidirectional communication component 22, described above. The energy meter 50 includes a metering unit 51, a communication module 52, a storage unit 53, a current-time measuring unit 54, a control unit 55 and a battery 57.

The metering unit 51 meters energy consumption in each load 19-1 to 19-k. As a specific example, the metering unit 51 may meter an accumulated consumption amount of energy.

The communication module 52 functions to communicate with the metering data collector 25 through the first communicate network 15.

The storage unit 53 is a nonvolatile storage medium readable and writable, in which digital data is stored.

The current-time measuring unit 54 provides information on a current time to the control unit 55. The current-time measuring unit 54 may be configured using a real time clock (RTC) or the like.

The control unit 55 may be configured using a microprocessor or central processing unit (CPU). The control unit 55 generally controls the energy meter 50.

The control unit 55 stores the information on the energy consumption metered by the metering unit 51 in the storage unit 53 and manages the stored information. The control unit 55 examines whether or not the current time measured by the current-time measuring unit 54 becomes a transmission time.

If the transmission time is reached, the control unit 55 transmits the information on the energy consumption, stored in the storage unit 53, to the metering data collector 25 through the communication module 52.

The energy meter 50 may operate by receiving power supplied from the battery 57. The control unit 55 may operate in a power saving mode except when the control unit 55 communicates with the metering data collector 25. In the power saving mode, the supply of power to the communication module 52 may be interrupted.

FIG. 5 is merely an example for illustrating the energy metering method according to the present invention. The energy meter 50 may be variously configured according to the kind and requirement of energy.

For example, the energy meter 50 may include the function of a user interface (UI) that displays the information on the energy consumption or enables information necessary for a user to be inputted, and the like.

Hereinafter, an embodiment of the energy metering method according to the present invention will be described in detail with reference to FIG. 6.

The central server 27 provides information on an energy pricing system, changed depending on time, to the metering data collector 25 (S231). The metering data collector 25 transmits a control signal to each of the energy meters 50 based on the information on the energy pricing system (S232).

The control signal refers to a signal that enables the each of the energy meters 50 to determine a transmission time.

The metering data collector 25 may directly specify a transmission time and transmit the specified transmission time as a control signal. Alternatively, the metering data collector 25 may transmit, as a control signal, data information that enables each of the energy meters 50 to determine a transmission time by itself.

The control signal is received through the communication module 52 of each of the energy meters 50, and the control unit 55 of each of the energy meters 50 determines a transmission time based on the received control signal (S233).

As described with reference to FIG. 3, the transmission time may be determined as a time at which energy price is changed.

Meanwhile, the metering unit 51 of each of the energy meters 50 meters energy consumption generated by the loads 19-1 to 19-k (S234). The control unit 55 stores information on the energy consumption metered by the metering unit 51 (S235).

The control unit 55 of the each of the energy meters 50 monitors whether or not the transmission time is reached using the information on the current time measured by the current-time measuring unit 54 (S236).

If the transmission time is reached, the energy meter 50 transmits the information on the energy consumption at the current time to the metering data collector 25 through the communication module 52 (S237). The steps S234 to S237 are repeatedly performed.

The control unit 55 of each of the energy meters 50 transmits the information on the energy consumption through the step S237 and then operates the energy meter 50 in the power saving mode until when it is determined that the transmission time is again reached at the step S236. In the power saving mode, the supply of power to the communication module 52 may be interrupted.

The metering data collector 25 that receives the information on the energy consumption from each of the energy meters 50 collects the information on the energy consumption, transmitted from the respective energy meters 50, and transmits the collected information to the central server 27 (S238). The central server 27 manages the information on the energy consumption for the respective energy meters 50, received from the metering data collector 25, and calculates an energy consumption rate to be charged to an individual user based on the managed information (S239).

According to the present invention, the energy meter transmits information on energy consumption at a predetermined transmission time.

If the transmission time is controlled as a changed time of energy price under an energy pricing system changed depending on time, the information on the energy consumption at each energy price period is transmitted. This means that the central server transmits all the information required in calculating the energy consumption rate of an individual energy consuming household while the energy meter performs only minimum communication.

Further, the energy meter or the bidirectional communication component may operate in a power saving mode except the predetermined transmission time.

If the communication is performed at the transmission time together with the power saving mode, it is possible to minimize power used in the communication while the central server transmits all the information required in calculating the energy consumption rate.

Particularly, a battery can be used longer in an environment in which the energy meter or the bidirectional communication component operate using the battery, thereby reducing maintenance/repair cost.

Although the present invention has been described in connection with the preferred embodiments, the embodiments of the present invention are only for illustrative purposes and should not be construed as limiting the scope of the present invention. It will be understood by those skilled in the art that various changes and modifications can be made thereto within the technical spirit and scope defined by the appended claims.

What is claimed is:

1. An energy metering system comprising:
   a meter including:
      a metering unit configured to generate energy consumption information based on loads at various locations;
      a memory configured to store the energy consumption information;
      a communication unit configured to receive and transmit the energy consumption information;
      a current-time measuring unit configured to measure a current time using a real-time clock;
      a battery configured to supply power to the communication unit;
      a controller configured to:
         cause the communication unit to receive control data related to a transmission time from a collector;
         cause the communication unit to transmit the energy consumption information or an alarm message to the collector when the voltage of the battery decreases to a certain value or less;
         determine the transmission time based on the control data;
         monitor whether the transmission time is reached by using the measured current time;
         cause the communication unit to transmit the energy consumption information to the collector via a first network if the transmission time is reached; and
         operate in a power saving mode during which power is entirely interrupted except at the transmission time;
   the collector configured to transmit the energy consumption information received from the communication unit to a server via a second network and to generate the control data based on information related to an energy pricing system and transmit the control data and an energy cost received from the server to the communication unit via the first network; and
   the server configured to transmit the energy cost to the collector and receive the energy consumption information from the collector via the second network,
   wherein the transmission time includes a time at which the energy cost changes.

2. The system of claim 1, wherein the meter is powered by the battery.

3. The system of claim 1, wherein the energy includes at least electricity, gas, or water.

4. The system of claim 1, wherein the energy consumption information includes an amount of accumulated energy between successive transmission times.

5. The system of claim 1, wherein the second network includes an Internet network using TCP/IP protocol.

* * * * *